(12) United States Patent  
Toyonaga et al.

(10) Patent No.: US 6,211,481 B1
(45) Date of Patent: Apr. 3, 2001

(54) POWER SUPPLY DEVICE FOR ELECTRIC DISCHARGE MACHINING APPARATUS

(75) Inventors: Tatsuo Toyonaga; Yuji Kaneko, both of Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/325,739

(22) Filed: Jun. 4, 1999

(30) Foreign Application Priority Data

Jun. 10, 1998 (JP) .................................................. 10-176542

(51) Int. Cl.[7] ............................................................ B23H 1/02
(52) U.S. Cl. ........................................ 219/69.13; 219/69.18
(58) Field of Search .............................. 219/69.13, 69.18; 323/282, 283

(56) References Cited

U.S. PATENT DOCUMENTS

| 5,149,931 | | 9/1992 | Magara | 219/69.18 |
| 5,317,122 | * | 5/1994 | Ito et al. | 219/69.18 |
| 5,416,290 | * | 5/1995 | Magara et al. | 219/69.18 |
| 5,488,329 | * | 1/1996 | Ridgers . | |
| 5,874,703 | | 2/1999 | Derighetti et al. | 219/69.18 |
| 5,986,232 | * | 11/1999 | Kaneko et al. | 219/69.18 |

FOREIGN PATENT DOCUMENTS 61-4620  4/1996  (JP) .

* cited by examiner

Primary Examiner—Geoffrey S. Evans
(74) Attorney, Agent, or Firm—McDermott, Will & Emery; Paul Devinsky

(57) ABSTRACT

A power supply device for an electric discharge machining apparatus, comprising a d.c. power source (2), a bridge circuit (80) having one pair of opposed switching circuits and the other pair of opposed switching circuits, and a controller (90) for alternately turning on either the one pair of switching circuits or the other pair of switching circuits so that high frequency a.c. voltage pulses are applied from a d.c. power source across a gap (G) formed between a workpiece (61) and a tool electrode (62). The four switching circuits (81, 82, 83, 84) respectively include at least two switching transistors connected in parallel, and the controller alternately turns on the least two transistors for each of the four switching circuits.

3 Claims, 3 Drawing Sheets

POWER SUPPLY DEVICE FOR ELECTRIC DISCHARGE MACHINING APPARATUS

FIELD OF THE INVENTION

The present invention relates to an electric discharge machining apparatus for machining a workpiece by applying electrical pulses to a machining gap formed between the workpiece and a tool electrode, and particularly to an electric discharge machining apparatus provided with a switching circuit for generating high frequency a.c. voltage pulses from a d.c. power source.

BACKGROUND OF THE INVENTION

When power is applied from a d.c. or a.c. power supply to a small gap formed between a tool electrode of an electric discharge machining apparatus and a conductive workpiece, simply known as a "machining gap" or "gap", the resistance of dielectric fluid across the gap is reduced. Then, when the insulation properties of the dielectric fluid are broken down, an electric discharge is generated and machining "on-time" begins. During a controlled on-time, a discharge current flows through the gap resulting in vaporization or melting of the workpiece material. When the on-time is completed, application of power is suspended resulting in controlled "off-time", in order to restore the insulation properties of the dielectric fluid. A decrease in the on-time, in other words a reduction in energy for one electric discharge, is known to contribute to an improvement in surface roughness.

U.S. Pat. No. 5,149,931 discloses an electric discharge machining method for causing the surface roughness of a workpiece to be reduced to 1 mRmax or less by applying high frequency a.c. voltage from an a.c. power source to the gap.

This patent also describes that changing the polarity of the voltage applied to the machining gap for each electric discharge and distributing the position at which electric discharge occurs contributes to a good quality machined surface.

FIG. 3 illustrates a power supply device for use in an electric discharge machining apparatus that generates a.c. voltage pulses from a d.c. power source. The power supply includes a d.c. power source 2 for outputting a d.c. voltage E, an output capacitor C and a bridge circuit 3. These electrical components are usually housed in a cabinet which also includes a controller which controls the on-time and off-time, and which is positioned at a distance away from the workpiece 61 and the wire electrode 62. In the illustrated embodiment, the bridge circuit 3 is connected through a low capacitance cable 7 to the workpiece 61 and the wire electrode 62. As shown in the drawing, the bridge circuit 3 comprises switching transistors 31, 32, 33 and 34 connected in series so as to form four nodes 3A, 3B, 3C and 3D. One pair of diagonally opposite nodes 3A and 3B are respectively connected to positive and negative terminals of the d.c. power source 2. The other pair of nodes, 3C and 3D, are respectively connected to the workpiece 61 and the wire electrode 62. A current limiting resistor 35 is connected between the nodes 3A and 3C, and a current limiting resistor 36 is connected between nodes 3B and 3D. A controller 4 generates a gate control pulse signal PA for controlling the on/off switching operation of one pair of switching transistors 31 and 34, and a gate control pulse signal PB for controlling the on/off switching operation of the other pair of switching transistors 32 and 33. The controller 4 generates the pulse signals PA and PB to alternately switch on and off the pair of switching transistors 31 and 34 and the pair of switching transistors 32 and 33. As a result, an a.c. pulse voltage PV inverted in polarity at the same frequency as the pulse signal PA across the nodes 3C and 3D of the bridge circuit 3 is applied as a voltage V to a gap G, formed between the workpiece 61 and the wire electrode 62, to machine the workpiece 61.

Since the surface roughness of the workpiece 61 becomes smaller as the frequency of the a.c. pulse voltage VP increases, MOSFETs that have a high operating speed are often used as the switching transistors 31, 32, 33 and 34. In order to operate these MOSFETs at a high frequency, i.e., on the order of a few MHz, a MOSFET of at least 50 W is necessary. Thus is true even in the lowest frequency case, taking into consideration the effects of stray capacitance and distributed inductance, etc. of the circuit from the nodes 3C and 3D to the gap G. Also, the rated voltage of a MOSFET for supplying a voltage of 50–100V necessary to generate electric discharge at the gap G is preferably at least 200V. Because of these requirements, a MOSFET for a bridge circuit for generating a high frequency a.c. voltage pulse from a d.c. power source has an input capacitance of 700–1600 pF. The relationship between the input capacitance $C_{in}$ and power loss $P_d$ occurring as a result of driving the MOSFET is given below where $V_{GS}$ is a voltage across the gate and source of the MOSFET, f is the frequency of the a.c. voltage pulses:

$$P_d = C_{in} \cdot f \cdot V_{GS}^2 \qquad (1)$$

Accordingly, if, for example, $C_{in}=700$ pF, $V_{GS}=20$ V and f=5 MHz, power loss will be 1.4 W. The rated value of a commercial DIP (Dual In-line Package) is less than 1 W. This means that if the drive loss is 1.4 W, the DIP will need to be fitted with a heat dissipation device, such as fins. However, the surface area occupied by such cooling fins on the printed substrate of the DIP is relatively large and as a result the physical distance between the drive circuit and the MOSFET is increased. There is also undesirable series resonance caused by the inductance between the drive circuit and the MOSFET and the input capacitance ($C_{in}$) of the MOSFET.

SUMMARY OF THE INVENTION

An object of the present invention is to provide a power supply device for generating high frequency a.c. voltage pulses without increasing the surface area of the switching transistor drive circuit on the printed substrate.

Additional objects, advantages and novel features of the invention will be set forth in the description that follows, and in part will become apparent to those skilled in the art upon reading this description or practicing the invention. The objects and advantages of the invention may be realized and attained by practicing the invention as recited in the appended claims.

In order to achieve the above described objects, and in according with the present invention, there is provided a power supply for an electric discharge machining apparatus; the power supply comprises a d.c. power source, a bridge circuit having a first pair of switches and a second pair of switches, and a controller for alternately turning on either the first or second pair of switches so that high frequency a.c. voltage pulses are applied from a d.c. power source to a gap between a workpiece and a tool electrode. The four switches include at least two switching transistors connected in parallel, and the controller alternately turns on at least two transistors for each of the four switches.

BRIEF DESCRIPTION OF THE FIGURES

The accompanying drawings, which are incorporated in and form a part of the specification, illustrate an embodiment of the present invention, and together with the description serve to explain the principles of the invention. In the drawings.

PREFERRED EMBODIMENT OF THE INVENTION

An embodiment of the present invention will now be described in detail below, with reference to the drawings.

Figure 1:
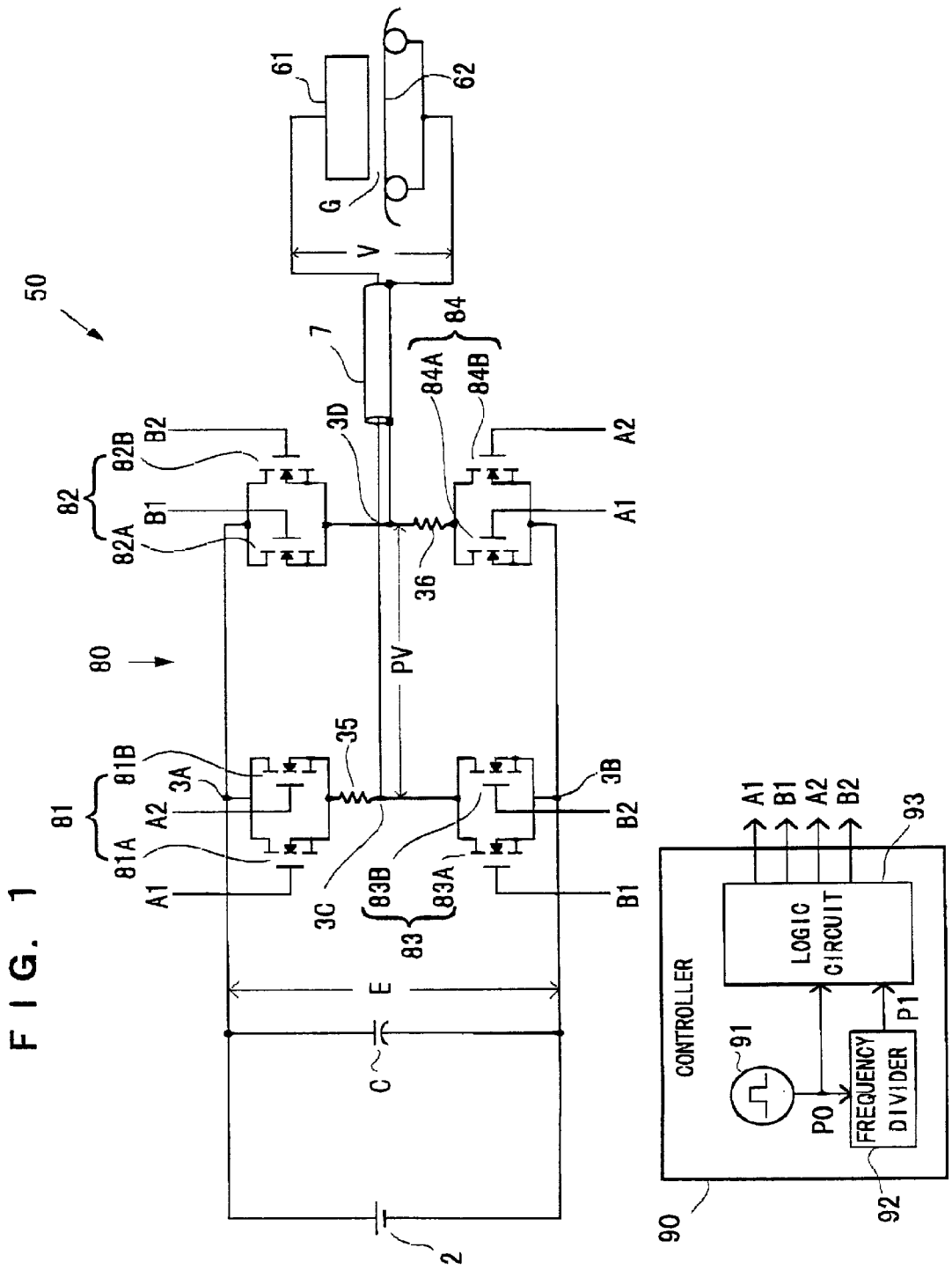
FIG. 1 is a circuit diagram illustrating an embodiment of a power supply and controller according to the present invention.

FIG. 1 illustrates a power supply device for an electric discharge machining apparatus according to the present invention that can generate a.c. voltage pulses from a d.c. power source. Similar elements are labeled with similar reference numerals as those used in FIG. 3.

In FIG. 1, a power supply 50 contains a bridge circuit 80. As shown in the drawings, the bridge circuit 80 comprises switching circuits 81, 82, 83 and 84 connected in series so as to form four nodes 3A, 3B, 3C and 3D. Each of the switching circuits 81, 82, 83 and 84 comprise a plurality of switching transistors connected in parallel, and in the embodiment shown, each comprises two switching transistors 81A and 81B, 82A and 82B, 83A and 83B, and 84A and 84B.

Figure 2:
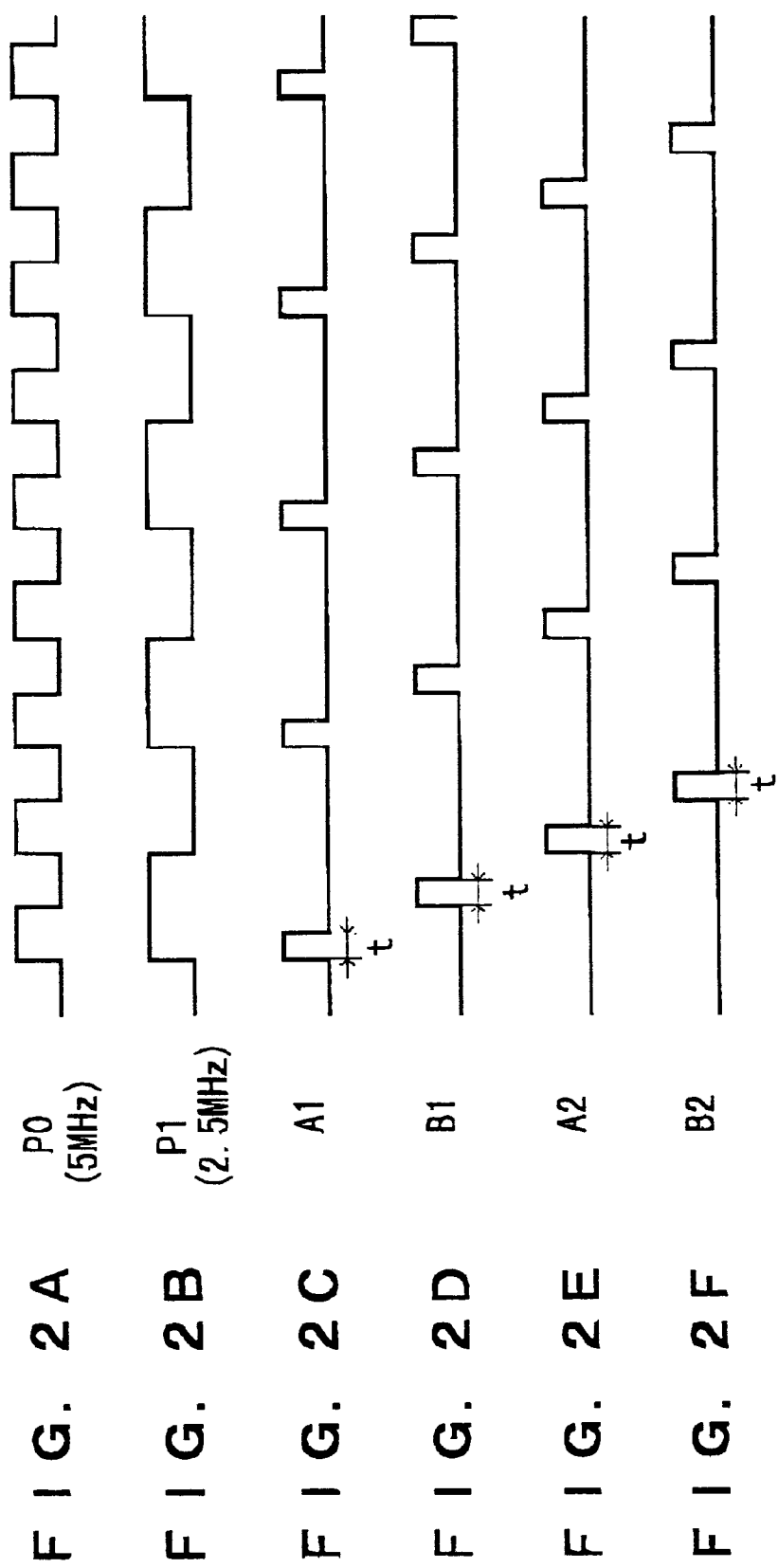
FIGS. 2A, 2B, 2C, 2D, 2E and 2F are timing charts illustrating the operation of the controller of the power supply device of FIG. 1.
Figure 3:
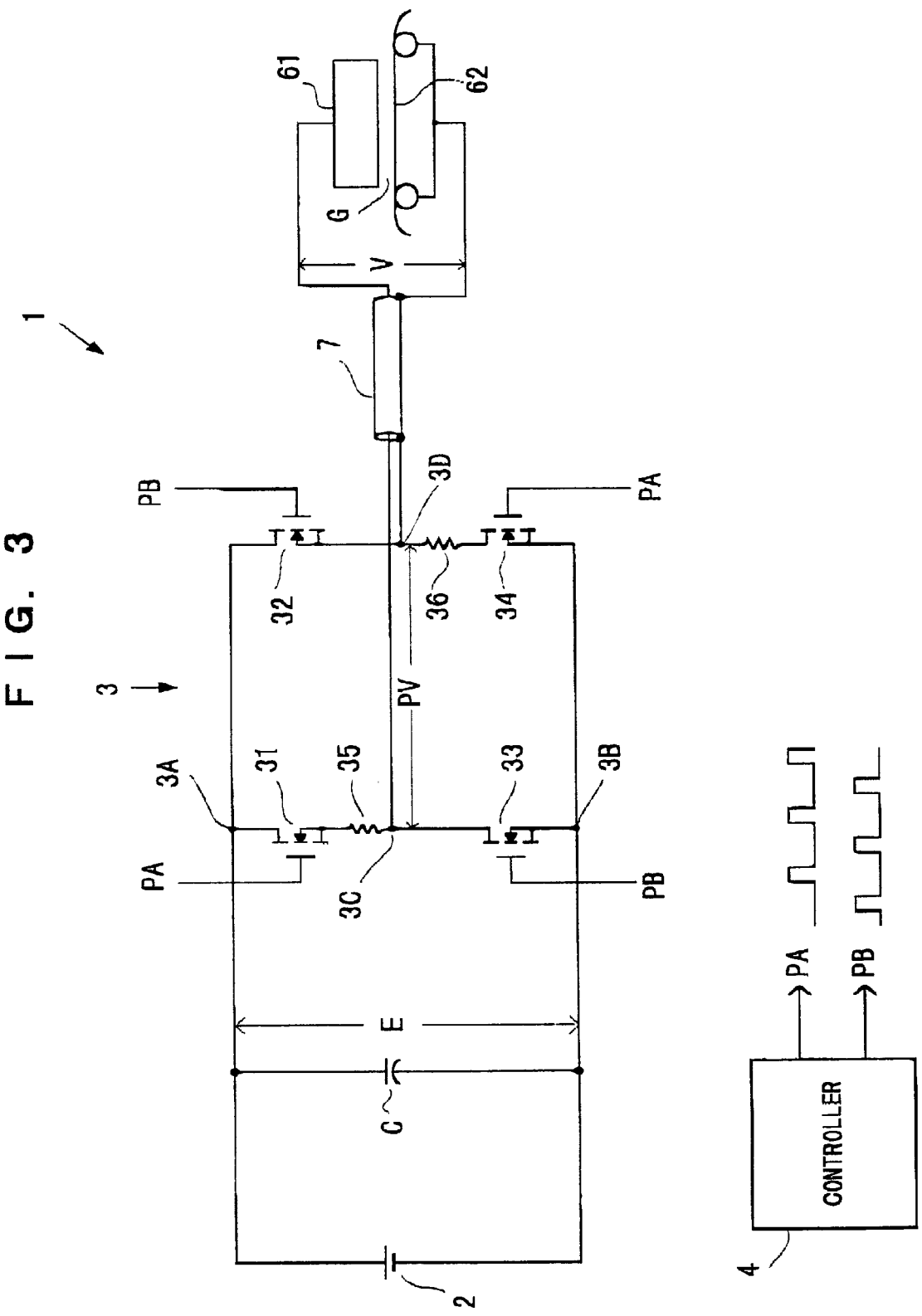
FIG. 3 is a circuit diagram illustrating a power supply device according to the related art.

A controller 90 controls the on/off switching operation of the switching transistors 81A, 81B, 82A, 82B, 83A, 83B, 84A and 84B. The controller 90 comprises a base pulse generator 91, a frequency divider 92 and a logic circuit 93. The base pulse generator 91 supplies a 5 MHz base pulse signal P0, shown in FIG. 2A, to the frequency divider 92 and the logic circuit 93. The frequency divider 92 divides the base pulse signal P0 and supplies a 2.5 MHz pulse signal P1, shown in FIG. 2B, to the logic circuit 93. Based on the pulse signals P0 and P1, the logic circuit 93 generates gate control signals A1, A2, B1 and B2 having a frequency of 2.5 MHz and being of different phases with respect to each other. As shown in FIG. 2C, the first pulse signal A1 is held at a high level for a fixed time t starting from each rising edge of the pulse signal P1. As shown in FIG. 2D, the second pulse signal B1 is held at a high level for the fixed time t starting from the falling edge of pulse signal P0, while the pulse signal P1 is at a high level. As shown in FIG. 2E, the third pulse signal A2 is held at a high level for a fixed time t starting from the falling edge of pulse signal P1. As shown in FIG. 2F, the fourth pulse signal B2 is held at a high level for the fixed time t starting from the falling edge of pulse signal P0, while the pulse signal P1 is at a low level. The pulse signals A1, B1, A2 and B2 are applied as shown in FIG. 1, to the gates of the switching transistors 81A, 81B, 82A, 82B, 83A, 83B, 84A and 84B of the bridge circuit 80. One pair of opposed switching circuits 81 and 84 are in a conduction state when either one of the first and third pulse signals, A1 and A2, is at a high level. The other pair of opposed switching circuits, 82 and 83 of the bridge circuit 80, are in a conduction state when either one of the second and fourth pulse signals, B1 and B2, is at a high level. As a result, an a.c. pulse voltage PV, changing polarity in synchronism with the base pulse signal P0, namely at a frequency of 5 MHz, is applied to the gap G from between the nodes 3C and 3D of the bridge circuit 80. For each of the illustrated switching circuits 81, 82, 83 and 84, each of the two parallel connected switching transistors are, respectively, driven by two 2.5 MHz pulse signals having a phase delay of 180°. This means that each of the two parallel switching transistors is alternately turned on each time a switching circuit should be in its conduction state. The power losses associated with the switching transistors in FIG. 1 is half as compared to the power losses in the transistors of FIG. 3 if the frequency of the a.c. voltage pulses PV from the bridge circuit 80 is the same as the frequency of the a.c. voltage pulses PV from the bridge circuit 3. Also, if the switching transistors of FIG. 1 and FIG. 3 are permitted to have the same power loss, the frequency of the a.c. voltage pulses PV of the power supply device 50 of FIG. 1 will be twice the frequency of the power supply device 1 of FIG. 3. As a result, since the power supply device 50 can provide high frequency a.c. voltage pulses to the gap G without increasing the heat generated in the switching transistors and their drive circuit, it is possible to improve the machined surface roughness without the addition of a cooling structure for the DIPs constituting the drive circuit.

In the embodiment shown, the switching circuits 81, 82, 83 and 84 are respectively made up of two switching transistors connected in parallel, but in general may comprise n switching transistors, where n is at least 2. In this case, the frequency of the on/off switching operation of each switching transistor is preferably 1/n of the switching frequency of each switching circuit. This means that if n switching transistors are used, the loss for each switching transistor will become 1/n. Accordingly, compared to a bridge circuit having four switches, each comprising a single switching transistor, a bridge circuit having four switches, each comprising n switching transistors connected in parallel, can increase the frequency of the a.c. voltage pulses by up to n times.

The foregoing description of a preferred embodiment of the inventions has been presented for the purposes of illustration and description. It is not intended to be exhaustive or to limit the invention to the exact form disclosed, and obviously many modifications and variations are possible in light of the above teaching. It is intended that the scope of the invention be defined by the appended claims.

What is claimed is:

1. A power supply device for an electric discharge machining apparatus for machining a workpiece by means of a tool electrode, comprising:
    a d.c. power source,
    a bridge circuit having a first pair of opposed switches and a second pair of opposed switches;
    a controller for alternately turning on either the first pair of switches or the second pair of switches so that high frequency a.c. voltage pulses from a d.c. power source are applied across a gap formed between the workpiece and the tool electrode;
    wherein the the first and second pairs of switches each include at least two switching transistors connected in parallel, and wherein the controller alternately turns on the least two switching transistors for each of the first and second pairs of switches.

2. The power supply according to claim 1 wherein each of the first and second pairs of switches include n switching transistors connected in parallel and wherein the controller sequentially turns on each of the n switching transistors for each of the first and second pairs of switches.

3. A method of machining a workpiece by as follows: electric discharge using tool electrode comprising the steps of:

(a) positioning the workpiece across a machining gap from the tool electrode;

(b) connecting a d.c. power source to a four-arm bridge circuit, each arms of the bridge circuit having at least two switches connected in parallel;

(c) applying an alternating current pulse train from the d.c. power source to the machining gap by the following sequential steps:

(i) turning on one of the at least two switches of each of a first pair of opposite arms of the bridge circuit for a predetermined on time;

(ii) turning on one of the at least two switches of the other pair of opposite arms of the bridge circuit for the predetermined on time;

(iii) turning on the other of the at least two switches of each the first pair of opposite arms of the bridge circuit for the predetermined time period;

(iv) turning on the other of the at least two switches of the other pair of opposite arms of the bridge circuit for the predetermined time period.

* * * * *